US010572594B2

United States Patent
Kakirwar et al.

(10) Patent No.: US 10,572,594 B2
(45) Date of Patent: *Feb. 25, 2020

(54) EXTRACTING DOMAIN-SPECIFIC ACTIONS AND ENTITIES IN NATURAL LANGUAGE COMMANDS RECOGNIZED BASED ON EDITION AND RECOGNITION SCORES

(71) Applicant: INTUIT INC., Mountain View, CA (US)

(72) Inventors: Prateek Kakirwar, Mountain View, CA (US); Avinash Thekkumpat, Mountain View, CA (US); Jeffrey Chen, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 39 days.

This patent is subject to a terminal disclaimer.

(21) Appl. No.: 15/666,480

(22) Filed: Aug. 1, 2017

(65) Prior Publication Data
US 2019/0042561 A1  Feb. 7, 2019

(51) Int. Cl.
*G06F 17/27* (2006.01)
*H04W 4/02* (2018.01)
*G10L 15/22* (2006.01)
*G10L 15/18* (2013.01)
(Continued)

(52) U.S. Cl.
CPC ........ *G06F 17/2785* (2013.01); *G06F 17/278* (2013.01); *G06F 17/2765* (2013.01);
(Continued)

(58) Field of Classification Search
CPC .............................. G06F 17/2785; H04W 4/02
(Continued)

(56) References Cited

U.S. PATENT DOCUMENTS

| 8,447,863 | B1* | 5/2013 | Francis, Jr. ............. H04W 4/02 709/226 |
| 2013/0179460 | A1 | 7/2013 | Acuna et al. |

(Continued)

FOREIGN PATENT DOCUMENTS

WO   2016/118794 A1   7/2016

OTHER PUBLICATIONS

Lee C. et al., "Example-based dialog modeling for practical multi-domain dialog system," Speech Communication, Elsevier Science Publishers, Amsterdam, NL, vol. 51, No. 5, May 2009 (May 2009), pp. 466-484.

(Continued)

*Primary Examiner* — Farzad Kazeminezhad
(74) *Attorney, Agent, or Firm* — Patterson + Sheridan, LLP

(57) ABSTRACT

The present disclosure relates to processing domain-specific natural language commands. An example method generally includes receiving a natural language command. A command processor compares the received natural language command to a corpus of known commands to identify a probable matching command to the received natural language command, wherein the matching is based on an edition error and a recognition error. The corpus of known commands comprises a plurality of domain-specific commands, each of which is mapped to one or more domain-specific entities. Based on the comparison, the command processor identifies one or more entities in the received natural language command to perform an action on based on the mapping of the one or more domain-specific entities in the probable matching command and executes a domain-specific action included in the natural language command on the identified entity.

20 Claims, 9 Drawing Sheets

(51) Int. Cl.
 *G10L 15/30* (2013.01)
 *G10L 15/06* (2013.01)

(52) U.S. Cl.
 CPC ............ G10L 15/22 (2013.01); *G10L 15/063* (2013.01); *G10L 15/18* (2013.01); *G10L 15/30* (2013.01); *H04W 4/02* (2013.01)

(58) Field of Classification Search
 USPC .......................................... 700/246; 709/226
 See application file for complete search history.

(56) References Cited

U.S. PATENT DOCUMENTS

2015/0348551 A1 12/2015 Gruber et al.
2016/0148612 A1 5/2016 Guo et al.
2016/0151918 A1\* 6/2016 Stoyanchev ........ G06F 17/2785
 700/246

OTHER PUBLICATIONS

Bang Jeesoo et al: "Open-domain personalized dialog system using user-interested topics in system responses", 2015 IEEE Workshop on Automatic Speech Recognition and Understanding (ASRU), IEEE, Dec. 13, 2015 (Dec. 13, 2015), pp. 771-776.

Cheongjae Lee et al: "Correlation-based query relaxation for example-based dialog modeling", 2809 IEEE Workshop on Automatic Speech Recognition & Understanding (ASRU 2089); Dec. 13-17, 2809; Merano, Italy, IEEE, Piscataway, NJ, USA, Nov. 13, 2009 (Nov. 13, 2009), pp. 474-478.

Sarikaya Ruh!: "The Technology Behind Personal Digital Assistants: An overview of the system architecture and key components", A IEEE Signal Processing Magazine, IEEE Service Center, Piscataway, NJ, US, vol. 34, No. 1, Jan. 2017 (Jan. 2017), pp. 67-81.

PCT/US2017/047746, International Search Report dated Mar. 23, 2018, 16 pages.

\* cited by examiner

EXTRACTING DOMAIN-SPECIFIC ACTIONS AND ENTITIES IN NATURAL LANGUAGE COMMANDS RECOGNIZED BASED ON EDITION AND RECOGNITION SCORES

BACKGROUND

Field

Embodiments presented herein generally relate to natural language processing, and more specifically to extracting domain-specific actions and entities in natural language commands.

Description of the Related Art

Natural language processing generally allows users of a software application to input a command to the software application as a spoken phrase specifying an action to perform and an entity to perform the action on. These spoken phrases need not be formatted in a specific manner for the software application to parse the command and identify the action to be performed and the entity to perform the action on. When a software application receives a natural language command for processing, a set of rules and decisions established for processing the commands can be used to interpret the natural language command and extract actions to be performed and entities to perform the actions on. These rules may be established manually or through machine learning, where a system that uses natural language processing continually creates, removes, and/or modifies the rules for processing natural language commands based on training data sets and corrections to the extracted actions and entities provided by one or more users of the software application.

Typically, natural language processing systems are configured for general computing tasks. For example, natural language processing systems deployed for use on mobile devices may be configured to process general computing tasks, such as identifying appointments on a user's calendar, obtaining navigation information to a user-specified destination, initiating a phone call, sending text messages, searching for information on the internet and other computing tasks that a user can perform on a mobile device. However, these natural language processing systems are generally not configured to process domain-specific commands, where actions and entities have specific definitions according to the domain in which the command is processed. Thus, there is a need for domain-specific action and entity recognition in natural language processing systems.

SUMMARY

One embodiment of the present disclosure includes a method for processing a domain-specific natural language command. The method generally includes generally includes receiving a natural language command. A command processor compares the received natural language command to a corpus of known commands to identify a probable matching command in the corpus of known commands to the received natural language command. The corpus of known commands comprises a plurality of domain-specific commands, each of which is mapped to a domain-specific action. Based on the comparison, the command processor identifies the domain-specific action associated with the probable matching command to perform in response to the received command and executes the identified domain-specific action.

Another embodiment provides a computer-readable storage medium having instructions, which, when executed on a processor, performs an operation for processing a domain-specific natural language command. The operation generally includes generally includes receiving a natural language command. A command processor compares the received natural language command to a corpus of known commands to identify a probable matching command in the corpus of known commands to the received natural language command. The corpus of known commands comprises a plurality of domain-specific commands, each of which is mapped to a domain-specific action. Based on the comparison, the command processor identifies the domain-specific action associated with the probable matching command to perform in response to the received command and executes the identified domain-specific action.

Still another embodiment of the present invention includes a processor and a memory storing a program, which, when executed on the processor, performs an operation for processing a domain-specific natural language command. The operation generally includes generally includes receiving a natural language command. A command processor compares the received natural language command to a corpus of known commands to identify a probable matching command in the corpus of known commands to the received natural language command. The corpus of known commands comprises a plurality of domain-specific commands, each of which is mapped to a domain-specific action. Based on the comparison, the command processor identifies the domain-specific action associated with the probable matching command to perform in response to the received command and executes the identified domain-specific action.

One embodiment of the present disclosure includes a method for processing a domain-specific natural language command. The method generally includes receiving a natural language command. A command processor compares the received natural language command to a corpus of known commands to identify a probable matching command to the received natural language command. The corpus of known commands comprises a plurality of domain-specific commands, each of which is mapped to one or more domain-specific entities. Based on the comparison, the command processor identifies one or more entities in the received natural language command to perform an action on based on the mapping of the one or more domain-specific entities in the probable matching command and executes a domain-specific action included in the natural language command on the identified entity.

Another embodiment provides a computer-readable storage medium having instructions, which, when executed on a processor, performs an operation for processing a domain-specific natural language command. The operation generally includes receiving a natural language command. A command processor compares the received natural language command to a corpus of known commands to identify a probable matching command to the received natural language command. The corpus of known commands comprises a plurality of domain-specific commands, each of which is mapped to one or more domain-specific entities. Based on the comparison, the command processor identifies one or more entities in the received natural language command to perform an action on based on the mapping of the one or more domain-specific entities in the probable matching command and executes a domain-specific action included in the natural language command on the identified entity.

Still another embodiment provides a processor and a memory storing a program, which, when executed on the processor, performs an operation for processing a domain-specific natural language command. The operation generally includes receiving a natural language command. A command processor compares the received natural language command to a corpus of known commands to identify a probable matching command to the received natural language command. The corpus of known commands comprises a plurality of domain-specific commands, each of which is mapped to one or more domain-specific entities. Based on the comparison, the command processor identifies one or more entities in the received natural language command to perform an action on based on the mapping of the one or more domain-specific entities in the probable matching command and executes a domain-specific action included in the natural language command on the identified entity.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Natural language processing systems are typically configured to process commands that are applicable to general computing tasks, such as searching for information on the internet or a local device, sending e-mail or text messages, pairing wireless devices, and obtaining navigation instructions to a destination. Thus, natural language processing systems may be unable to understand the significance of domain-specific actions and entities in a command. For example, a typical natural language processing system that receives the command, "Pay my XYZ bill" may not be able to determine that a user wants to pay a bill (i.e., initiate a funds transfer from one account to satisfy an outstanding balance on the bill from XYZ). In another example, a typical natural language processing system that receives the command, "Invoice ABC for $500" may not be able to determine that a user wants to request payment from a counterparty for the specified amount of money.

Aspects of the present disclosure provide a domain-specific natural language processing system that uses a corpus of known commands to allow a natural language processing system to recognize domain-specific actions and entities in received natural language commands. To train a natural language processing system to recognize domain-specific actions, the corpus of known commands may be annotated with information about a domain-specific action associated with each command in the corpus of known commands. Further, to train the natural language processing system to recognize domain-specific entities in a command, the corpus of known commands may be annotated with information about a location of a domain-specific entity in a string representing each command (e.g., the nth word in a string) and an entity type associated with each command in the corpus of known commands. The natural language processing system can compare a received command to the commands in the corpus of known commands and identify probabilistic matches between the received command and one or more commands in the corpus of known commands. Based on the identified probabilistic matches, the natural language processing system identifies domain-specific actions and entities on which an action is to be performed, which allows the natural language processing system to process domain-specific natural language commands.

Figure 1:
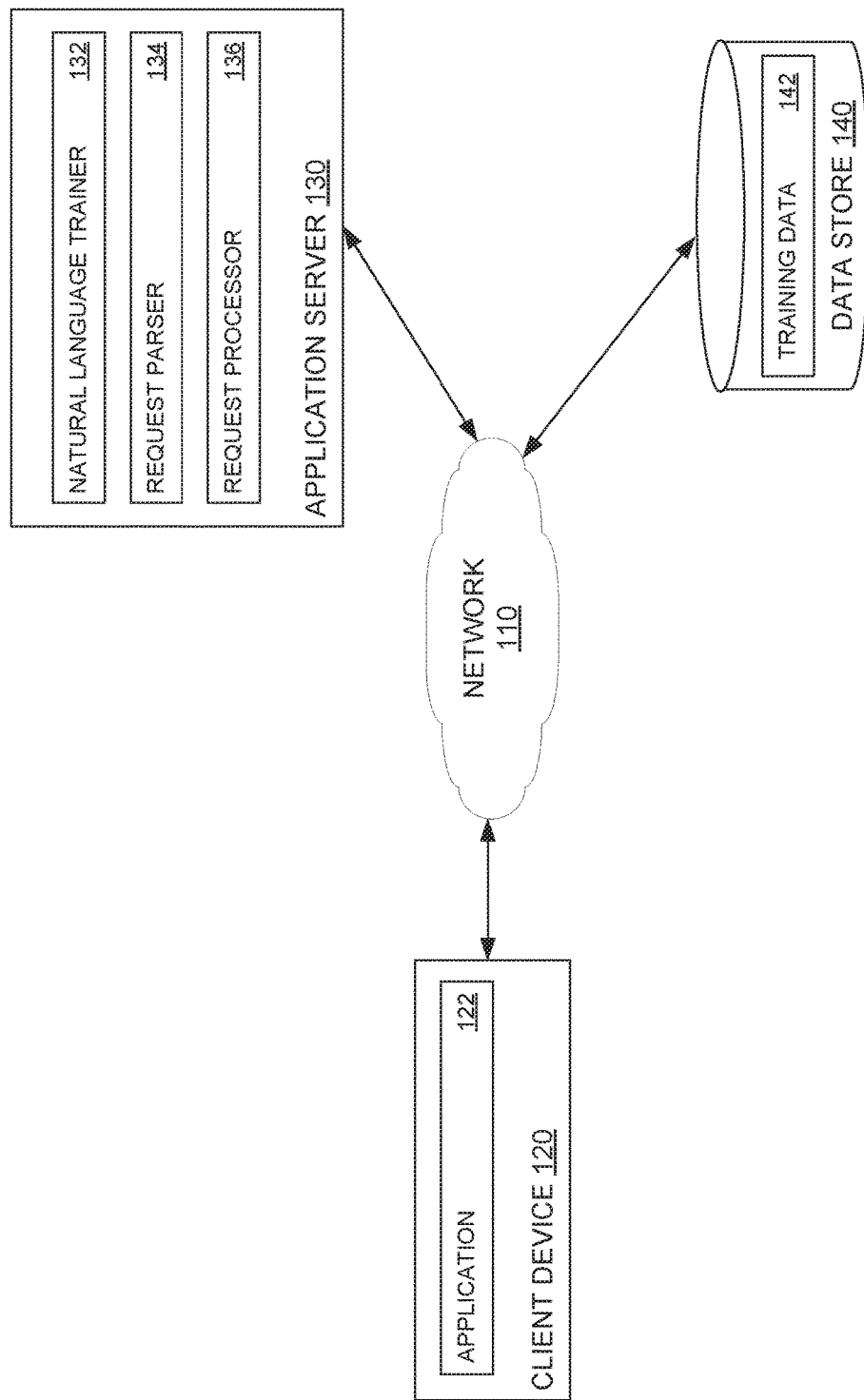
FIG. 1 illustrates an exemplary networked computing environment, according to one embodiment.

FIG. 1 illustrates an exemplary natural language processing system, according to an embodiment. As illustrated, system 100 includes a client device 120, application server 130, and data store 140, connected via network 110.

Client device 120 is included to be representative of a desktop computer, a laptop, a tablet, a smartphone, or any other computing device. As illustrated, client device 120 generally executes one or more applications 122. The applications 122 generally provide an interface for a user to input a natural language command for processing. In some cases, the interface may include a voice recorder which captures a user's voice input using one or more microphones integrated into or otherwise connected to client device 120. When application 122 captures voice input of a domain-specific command, a voice-to-text converter converts the spoken natural language command captured by application 122 into a text string that application 122 transmits to application server 130 for processing and command execution.

Application server 130 generally is trained using a training data set of a corpus of known commands to extract actions and entities from a received natural language command. As illustrated, application server 130 includes a natural language trainer 132, a request parser 134, and a request processor 136.

Natural language trainer 132 generally receives one or more training data sets (e.g., training data 142 in data store 140) to generate sets of rules for request parser 134 to use in identifying domain-specific actions and entities in a received natural language command. Generally, natural language trainer 132 uses the training data set to generate rules for scoring a received command against an action associated with the received command. These rules take into account the content and context of commands in the training data set and a comparison of the content of each command in the training data set to the tagged action with which the commands are associated and/or the tagged entities included in the commands. To generate rules for request parser 134 to identify domain-specific actions in a received natural language command, natural language trainer 132 uses a training data set including a corpus of known commands annotated with information identifying one or more domain-specific action words in each command and a mapping between the identified domain-specific action words to one or more domain-specific actions. Generally, annotating commands in the corpus of known commands includes tagging a command in the corpus of known commands with an associated domain-specific action or otherwise indicating that the command is associated with a particular domain-specific action. For example, the training data set may include a plurality of commands to initiate a payment action against a specified entity (e.g., "pay my ABC bill," "pay my DEF bill," "pay [amount] to ABC," pay ABC [amount]," and other commands to pay a bill), and each of the commands may be annotated with information identifying "pay" as an action word associated with a payment function provided by a domain-specific service. In some cases, natural language trainer 132 can generate rules associating the word "pay" and variants of the word with the payment function provided by the domain-specific service. In another example, the training data set may include a plurality of commands to initiate an invoice generation against a specified entity (e.g., "invoice ABC for [amount]") with annotations indicating "invoice" as an action word associated with an invoice generation function provided by the domain-specific service. Likewise, natural language trainer 132 can generate rules associating the word "invoice" and variants of the word with the invoice generation function provided by the domain-specific service.

To generate rules for request parser 134 to use in identifying domain-specific entities in a received natural language command, the training data set used by natural language trainer 132 may include a plurality of known commands annotated with information identifying a location of an entity in each command and a mapping between the identified location of an entity and the type of the entity in each command. The annotations may indicate an absolute location in the string representation of a command at which an entity is located. For example, a training data set may include a plurality of commands to initiate a payment action against a specified entity and, optionally, information identifying the amount of the payment to make to the specified entity. A command to "pay my ABC bill" may be annotated with information indicating that the position in which "ABC" appears in the command (i.e., word 3 in the command) is associated with an entity against which the payment command is to be executed and that the entity type associated with "ABC" is a counterparty to a transaction. In another example, a command to "pay $500 to ABC" may be annotated with information identifying two entities in the command. A first entity, represented by "$500" and located at word 2 in the command, may be annotated as a payment amount entity type, and a second entity, represented by "ABC" and located at word 4 in the command, may be annotated as a counterparty entity type. By annotating commands in the corpus of known commands with information about the location of an entity and the type of the entity at a specific location, natural language trainer 132 can generate a set of rules for request parser 134 to use in identifying domain-specific entities in a received natural language command that uses contextual information about a received command to identify entities in a received command to perform an action on.

Request parser 134 generally uses the rules established by natural language trainer 132 to analyze received commands and identify an action to perform in response to a received query and/or one or more entities to perform an action on, according to some embodiments. As discussed, request parser 134 can receive a natural language command from an application 122 executing on client device 120 as a text string representation of a spoken command. In some cases, however, request parser 132 can receive an audio file including a recording of a spoken command and generate a text string representing the spoken command, which may reduce an amount of time spent processing the received command at client device 120.

To identify an action to perform in a received natural language command, request parser 134 can, in some cases, compare the received natural language command to commands in the corpus of commands. Request parser 134 can generate a match probability score for each pairing of the received command and a command in the corpus of commands. The match probability score, in some cases, may be a number, edition error, and recognition error (NER) score indicating an accuracy of the received command compared to a known command in the corpus of commands. Generally, an NER score may be represented as $$\text{NER\_Score} = \frac{N - E - R}{N},$$

where N represents a number of words in the received command, E represents a number of edition errors compared to a known command, and R represents a number of recognition errors compared to a known command. An edition error generally indicates a deviation between a word in the received command and the corresponding word in the command in the corpus of commands. For example, an edition error may arise where the received command and the known command use the same base word but deviate in the ending portion of the word, such as the difference between using a verb and a gerund of the same base word (e.g., "pay" versus "paying"). A recognition error may arise where the received command and the known command use different words, which may arise, for example, in a comparison between different types of commands with different entities against which the commands are to be executed (e.g., a comparison between "pay my ABC bill" and "invoice XYZ").

If the match probability score indicates that the received command and the known command are an exact match (e.g., NER_Score=1.00, indicating that no edition errors or recognition errors were detected between the received command and the known command), request parser can provide the received command and an indication of the action to be performed to request processor 136 for processing. Otherwise, if request parser 134 determines that there is not an exact match between the received command and any of the commands in the corpus of known commands (e.g., no NER_Score=1.00), request parser 134 can analyze the match probability scores to identify the best match between the received command and the commands in the corpus of known commands. In some cases, request parser 134 can identify the command in the corpus of known commands having the highest match probability score and compare the match probability score to a threshold. If the match probability score of the identified command exceeds a threshold score, request parser 134 can provide the identified command and the associated action to request processor 136.

In some cases, if the computed match probability score of the closest match is less than a threshold score, request parser 134 can, based on the context of the received natural language command, extract a probable action word from the received natural language command for analysis. For example, request parser 134 can extract the word in a particular position of the received natural language command based on the position of action words in other commands in the corpus of known commands. After extracting the probable action word from the received natural language command, request parser 134 can compare the extracted probable action word against known action words in the corpus of known commands and identify a matching action to the probable action word. Upon identifying a matching action, request parser 134 provides an indication of the matching action and the received command to request processor for processing.

In one example, a domain-specific action may include generating an invoice. The invoice may be generated for a specified counterparty and a specified amount. The commands in the corpus of known commands may include a plurality of commands in the format of "invoice counterparty for specified amount." If request parser 134 receives a natural language command in the same format (e.g., "invoice XYZ Company for $500"), request parser 134 can map the received command to the "invoice" action and instruct request processor 136 to initiate an invoice generation function using the parameters included in the received natural language command. If, however, request parser 134 receives a natural language command in a different format, such as "Create an invoice for XYZ Company for $500," request parser 134 may first determine that the format of the received natural language command does not match the format of the invoice generation commands in the corpus of known commands. However, based on a word search of the received command, request parser 134 can determine that the word "invoice" or that the phrase "create an invoice" corresponds to a domain-specific action, as commands in the corpus of known commands include the word "invoice." Thus, request parser 134 can determine, from the context of the received command, that the received command corresponds to an invoice generation action and initiate the invoice generation function using parameters included in the received natural language command.

In some cases, if the probability scores calculated for the received command are each below a threshold value, request parser 134 can transmit a request for user confirmation of the action having the highest probability score to client device 120. The request for user confirmation generally indicates that the request parser identified the action having the highest probability score as the best match to the natural language command received from client device 120 and requests that the user indicate whether the identified action is correct or incorrect. If the user indicates that the identified action is correct, request parser 134 can add the received natural language command and a mapping between the identified action word and the identified action to training data 142, which may be used to update the rules used by request parser 134 for identifying actions in natural language commands, as discussed above. Otherwise, if the identified action is indicated to be incorrect, request parser 134 can present a list of possible actions to the user and request that the user select the desired action. After request parser 134 receives user confirmation that the identified action is correct or a user-specified action, request parser 134 can provide the identified action or the user-specified action to request processor 136 for processing, as discussed above.

Request parser 134 additionally parses received natural language commands to identify one or more entities specified in the command against which an action is to be performed, according to an embodiment. Similar to the processes for identifying domain-specific actions to be performed in a received natural language command, request parser 134 can compare the received natural language command to a corpus of known commands annotated with information identifying the location of an entity in the command and a type of the entity to determine the entity on which the specified action is to be performed. Request parser 134 can generate a match probability score for each pairing of the received command and a command in the corpus of commands. The match probability score, in some cases, may be a number, edition error, and recognition error (NER) score indicating an accuracy of the received command compared to a known command in the corpus of commands. If the NER score comparing the received command to a command in the corpus of known commands indicates that the received command is an exact match to a known command, request parser 134 can extract one or more entities from the received command based on the entity location and type mappings associated with the matching known command.

Otherwise, if the match probability scores indicate that there is not an exact match between the received command and any of the commands in the corpus of known commands, request parser 134 attempts to identify one or more commands in the corpus of known commands that are a partial match to the received command. For example, if request parser 134 receives the command "pay my AMZ bill," request parser 134 can identify commands such as "pay my ABC bill" as a partial match (e.g., from an NER score of 0.75, reflecting that three of the four words in both commands match) and determine that other commands, such as "invoice ABC $500," are not partial matches to the received command (e.g., from an NER score of 0, indicating that none of the words in the commands match) based on the match probability scores. The commands identified as partial matches, such as "pay my ABC bill," may be associated with relatively high match probability scores, while commands that are not partial matches, such as "invoice ABC $500," may be associated with relatively low match probability scores.

To identify the one or more words that are probable entities in the received natural language command, request parser 134 can use the entity type and location mappings for partially matching commands in the corpus of known commands to extract one or more entities from the received command. Referring back to the example of the received command "pay my AMZ bill," the partially matching commands in the corpus of known commands generally include commands matching the format of "pay my [entity] bill," where the entity to which funds are to be paid is a counterparty entity type and is located between the words "my" and "bill," or at word 3 in the string. Based on the mapping between an entity and the location of the entity, request parser can identify that "AMZ" is the entity on which the payment action is to be performed.

In another example, request parser 134 receives a command to "pay $750 to AMZ," and the corpus of known commands includes commands such as "pay $500 to XYZ," "pay $500 to ABC," and similar commands. Each of these commands may be mapped to two different entity types at different locations: a payment amount entity at word 2 in the string, and the counterparty entity at word 4 of the string. Using these mappings, request parser 134 can determine that the payment amount in the received command is $750 and the counterparty to which the payment is to be sent is "AMZ."

In some cases, if the probability scores calculated for the received command are each below a threshold value, request parser 134 can transmit a request for user confirmation of the extracted entities to client device 120. The request for user confirmation generally identifies the words that request parser 134 has identified as probable entities in the natural language command received from client device 120 and requests that the user indicate whether the identified entities are correct or incorrect. If the user indicates that the identified entities are correct, request parser 134 can add the received natural language command and mappings between the location of the identified entities and entity types in the received natural language command to training data 142, which may be used to update the rules used by request parser 134 for identifying entities in natural language commands, as discussed above. Otherwise, if the identified entities are indicated to be incorrect, request parser 134 can present a list of possible entities to the user and request that the user select the desired entities on which to perform a specified action. After request parser 134 receives user confirmation that the identified entities are correct or one or more user-specified entities, request parser 134 can provide the one or more entities to request processor 136 for processing, as discussed above.

After request parser 134 extracts the one or more entities from the received natural language request, request parser 134 instructs request processor 136 to perform an action specified in the natural language request. Request parser 134 generally provides the one or more entities extracted from the received natural language request to request processor 136, and request processor 136 can provide the one or more entities as arguments into the one or more functions that performs the specified action.

Request processor 136 generally performs a plurality of domain-specific actions defined by an application programming interface (API). These domain-specific actions, as discussed above, may include payment functions, funds transfer functions, and other functions for which actions and entities may have a specialized meaning within the domain but may not have a specialized meaning in more general command processing domains. Generally, request parser 134 provides to request processor 136 an indication of an action to perform and one or more entities to perform the action on. Request processor 136 uses the indication of the action to perform to execute one or more functions associated with the indicated action and uses the one or more entities provided by request parser 134 as arguments into the one or more functions such that the action is performed on the identified one or more entities. After the one or more functions returns a result, request processor 136 can transmit the returned result to client device 120 for display in application 122 (e.g., to confirm that the natural language command provided by the user was executed).

Data store 140 is illustrative of a networked data store that application server 130 can read a training data set from and write information to a training data set for use in training request parser 134 to identify actions and entities in domain-specific natural language commands, according to an embodiment. As illustrated, data store 140 includes training data 142. Training data 142 may be a repository storing one or more training data sets for training request parser 134. In some cases, the training data sets may include a plurality of known commands and mappings between the plurality of known commands and domain-specific actions that each command invokes. In other cases, the training data sets may include a plurality of known commands and mappings between the plurality of known commands and entities on which an action can be performed. The mapping data for the entities in a command may, in some embodiments, include information identifying a position in a string at which an entity word is located and a type of the entity (e.g., a counterparty, a payment amount, or other types of entities on which domain-specific actions can be performed).

Figure 2:
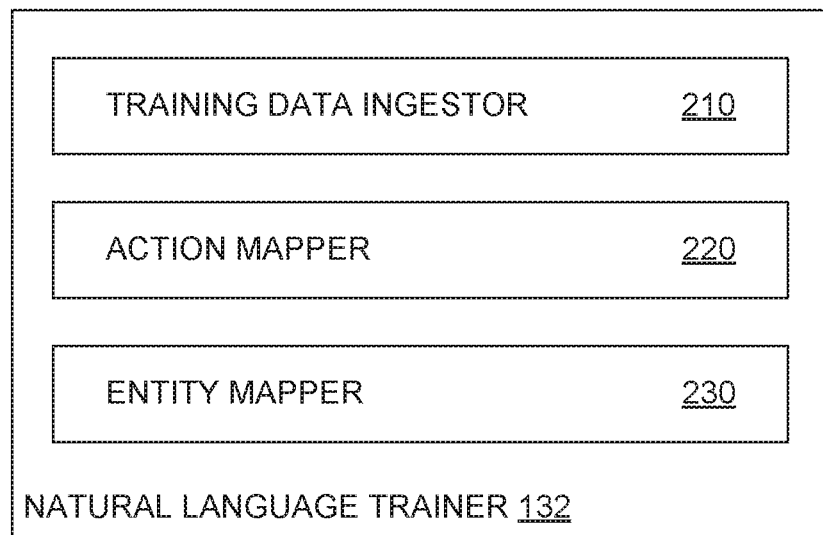
FIG. 2 illustrates an exemplary domain-specific natural language trainer that uses annotated training data to train a natural language processing system, according to one embodiment.

FIG. 2 illustrates an exemplary natural language trainer 132, according to an embodiment. As illustrated, natural language trainer 132 includes a training data ingestor 210, an action mapper 220, and an entity mapper 230.

Training data ingestor 210 generally obtains a training data set from data store 140 and ingests each command in the training data set for analysis. In some cases, the training data set may indicate to training data ingestor 210 whether the training data includes mappings of known natural language commands to domain-specific actions or mappings of known natural language commands to domain-specific entities. Based on the indication, training data ingestor 210 can route the commands in a training data set to action mapper 220 or entity mapper 230.

Action mapper 220 generally receives one or more commands ingested by training data ingestor 210 from an action training data set and analyzes the mappings between a natural language command and a specified action to generate rules for identifying an action that is to be performed in response to a received natural language command, according to an embodiment. Action mapper 220 may receive a natural language command and an associated domain-specific action, and, to generate a rule associating the received natural language command and the domain-specific action, perform a word search to find a probable action word in the received natural language command. The probable action word, in some cases, may be the word in the natural language command that has a highest match score to the domain-specific action. Based on the training data, action mapper 220 can generate rules associating probable action words with a domain-specific action. After generating the rules from an ingested training data set, action mapper 220 can instantiate request parser 134 with the determined rules for identifying actions in a received natural language command.

Entity mapper 230 generally receives one or more commands ingested by training data ingestor 210 from an entity training data set and analyzes the mappings between a natural language command and one or more specified entities to generate rules for identifying entities in a received natural language command on which one or more actions are to be performed, according to an embodiment. Entity mapper 230 may receive a natural language command and data indicating the location of an entity and the type of the entity. To generate a rule for recognizing an entity in a natural language command, entity mapper 230 can specify rules identifying an absolute location of an entity in a natural language command and rules identifying a location offset between a probable action word in the natural language command and the specified entity. After generating the rules from an ingested entity training data set, entity mapper 230 can instantiate request parser 134 with the determined rules for identifying entities in a received natural language command.

Figure 3:
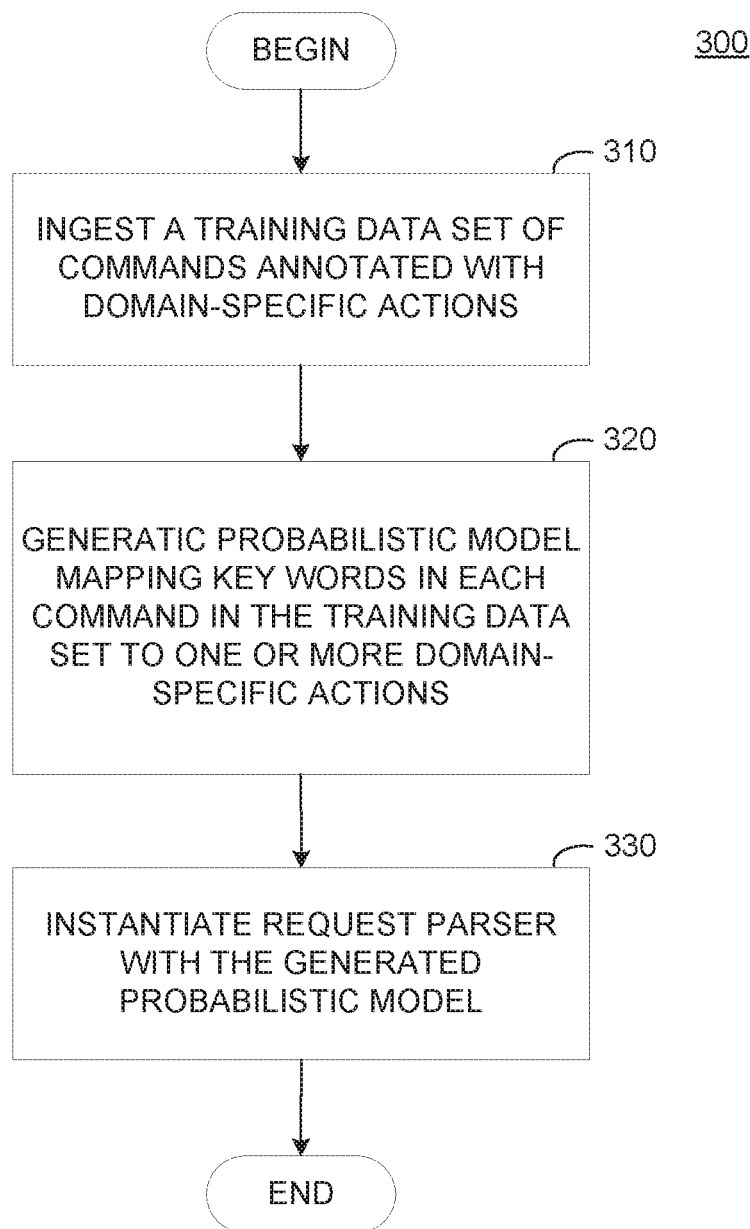
FIG. 3 illustrates exemplary operations for training an action identifier to recognize domain-specific actions using an annotated training data set, according to one embodiment.

FIG. 3 illustrates exemplary operations for training a request parser to identify one or more domain-specific actions in a received natural language command, according to an embodiment. As illustrated, operations 300 begin at step 310, where natural language trainer 132 ingests a training data set of commands annotated with domain-specific actions. As discussed, the training data set may include a plurality of commands, with each command having an action word and information indicating that the command invokes a specified domain-specific action.

At step 320, natural language trainer 132 generate a probabilistic model mapping key words in each command in the training data set to one or more domain-specific actions. To generate the probabilistic model, natural language trainer 132 can perform a word-by-word analysis of each natural language command in the training data set to identify an action word in each of the natural language commands that is associated with the specified domain-specific action. Natural language trainer 132 can aggregate data about the different action words identified in the natural language commands in the training data set to determine rules for calculating the probability that a received command invokes a specific action. For example, the rules may be established such that an exact match to a specified domain-specific action definitively indicate that the domain-specific action is to be performed, while variants of the action word may be associated with high probability scores that the identified action word in a command is associated with the domain-specific action.

At step 330, natural language trainer 132 instantiates a request parser with the generated probabilistic model. Generally, instantiating the request parser with the generated probabilistic model includes configuring the request parser to use the probabilistic model to analyze incoming natural language commands for the presence of specified actions, as discussed above.

Figure 4:
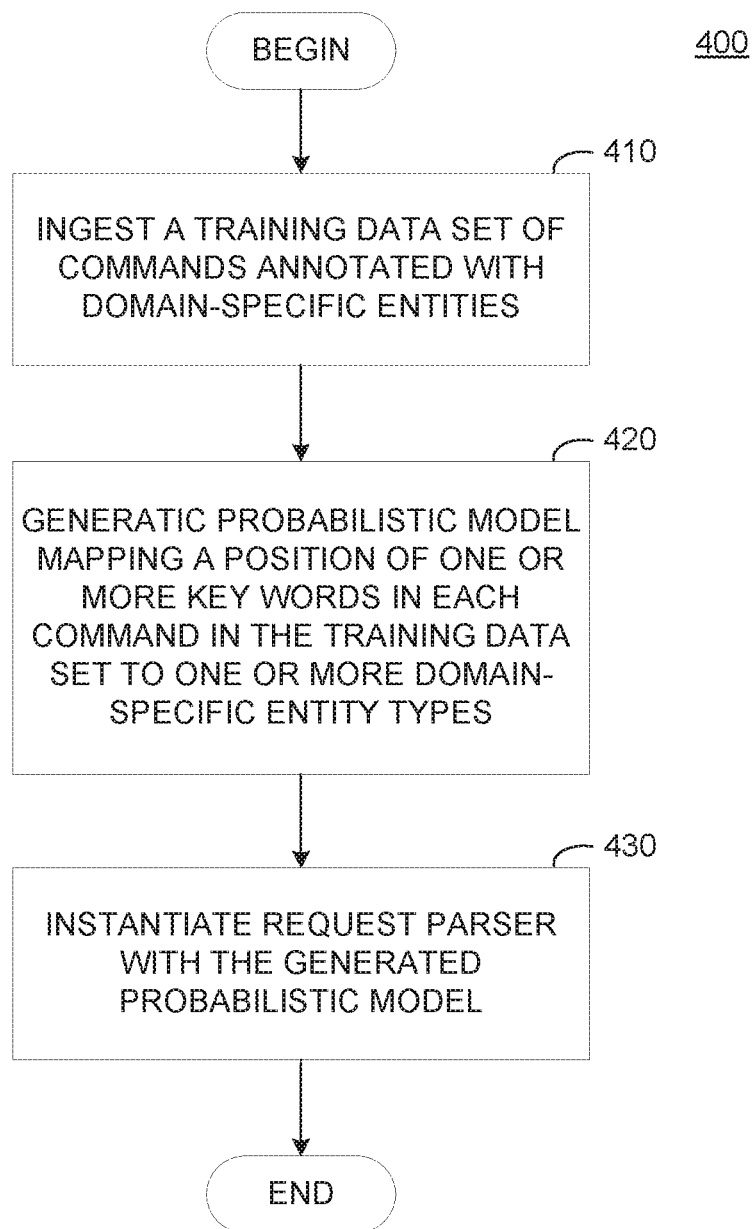
FIG. 4 illustrates exemplary operations for training an entity identifier to recognize domain-specific entities using an annotated training data set, according to one embodiment.

FIG. 4 illustrates exemplary operations for training a request parser to identify and extract one or more entities on which an action is to be performed from a received natural language command, according to an embodiment. As illustrated, operations 400 begin at step 410, where natural language trainer 132 ingests a training data set of natural language commands. The commands in the training data set are generally annotated with domain-specific entity information. For example, the commands may be annotated with information indicating a position of one or more entity words in the natural language command and a type of the entity.

At step 420, natural language trainer 132 generates a probabilistic model mapping key words in each command in the training data set to one or more domain-specific entities. As discussed above, natural language trainer 132 can use the entity position and type information associated with each natural language command in the training data set to determine rules for calculating the probability that a received command matches the format of a command in the training data set. In some examples, the rules may be established such that an exact match to the format of a natural language command in the training data set definitively indicates that the entity position information associated with a command in the training data set can be used to extract one or more entities from the received natural language command. Further, the rules may be established such that where an exact match between a received natural language command and the commands in the training data set does not exist, entities can be identified based on a relative position of entity words to an identified action word in the received natural language command.

At step 430, natural language trainer 132 instantiates a request parser with the generated probabilistic model. Generally, instantiating the request parser with the generated probabilistic model includes configuring the request parser to use the probabilistic model to analyze incoming natural language commands for the presence of one or more domain-specific entities, as discussed above.

Figure 5:
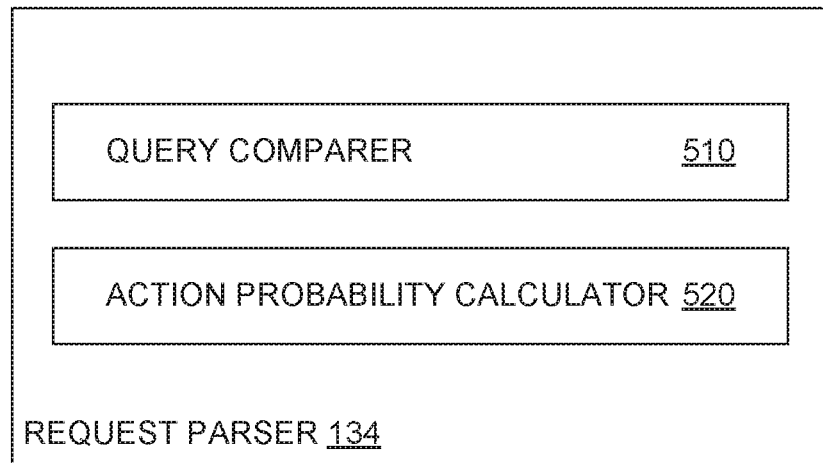
FIG. 5 illustrates an exemplary request parser for identifying actions in a domain-specific natural language command, according to one embodiment.

FIG. 5 illustrates an example request parser 134 for identifying an action to perform in response to a received natural language request, according to an embodiment. As illustrated, request parser 134 includes a query comparer 510 and an action probability calculator 520.

Query comparer 510 generally receives a natural language command from client device 120 and compares the received natural language command to one or more commands in the corpus of known commands. As discussed above, query comparer 510 can examine the corpus of known commands for exact matches between the received command and a command in the corpus of known commands. If query comparer 510 identifies an exact match between the received command and a command in the corpus of known commands, query comparer 510 can provide the received command and indication of the action associated with the command to request processor 136 for processing, as discussed above. Otherwise, if query comparer 510 does not find an exact match between the received command to a command in the corpus of received commands, query comparer 510 can instruct action probability calculator 520 to determine the most likely match between the received command and a command in the corpus of received commands.

Action probability calculator 520 generally compares a received command to one or more commands in the corpus of known commands to calculate a probability that an action associated with a command in the corpus of known commands corresponds to the action requested in the received natural language command. As discussed, action probability calculator 520 can generate a match probability score between the received command and each command in the corpus of known commands to identify an action associated with the command having the highest probability of matching the received natural language command. In some cases, the match probability score may be calculated as an NER score representing the relative accuracy of a received command against a command in the corpus of known commands. If action probability calculator 520 determines that the match probability score for a command exceeds a threshold level, action probability calculator 520 can determine that the action associated with the command corresponds to the requested action and can instruct request processor 136 to perform the action associated with the command on the entities specified in the received command.

If, however, action probability calculator 520 determines that the match probability scores calculated for the commands in the corpus of known commands are below the threshold, action probability calculator 520 can attempt to identify an action word in the received command and generate match probability scores for the identified action word against action words associated with commands in the corpus of known commands. A partial match between the identified action word and an action word in the corpus of known commands may, in some cases, indicate that the action associated with an action word in the corpus of known commands is the action to be performed. In some cases, however, if the probability scores calculated for each of the actions in the corpus of known commands is less than a threshold score, action probability calculator 520 can request that a user indicate, from a choice of a number of actions having the highest probability scores, the desired action for request processor 136 to perform.

Figure 6:
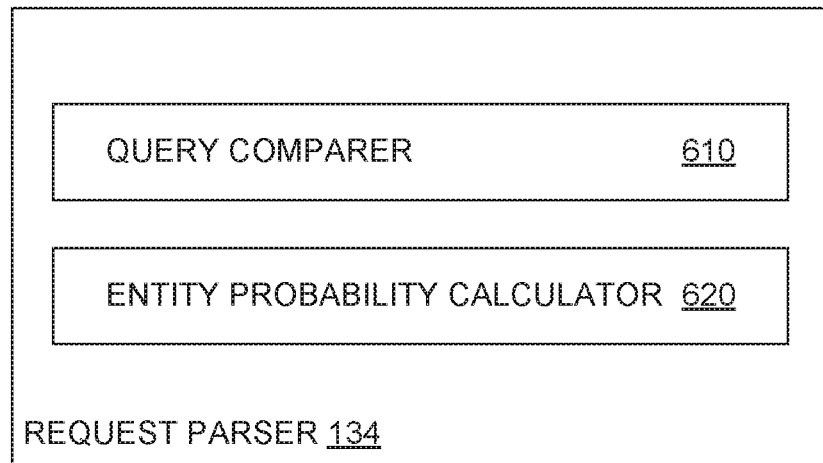
FIG. 6 illustrates an exemplary request parser for identifying entities in a domain-specific natural language command, according to one embodiment.

FIG. 6 illustrates an example request parser 134 for identifying one or more domain-specific entities in a received natural language command based on a probabilistic model and a comparison to commands in a corpus of known commands, according to an embodiment. As illustrated, request parser 134 includes a query comparer 610 and an entity probability calculator 620.

Query comparer 610 generally receives a natural language command from client device 120 and compares the received natural language command to one or more commands in the corpus of known commands. As discussed above, query comparer 610 can examine the corpus of known commands for exact matches between the received command and a command in the corpus of known commands. If query comparer 610 identifies an exact match between the received command and a command in the corpus of known commands, query comparer 610 can provide the received command and indication of the entities on which to perform a domain-specific action to request processor 136 for processing, as discussed above. Otherwise, if query comparer 610 does not find an exact match between the received command to a command in the corpus of received commands, query comparer 610 can instruct entity probability calculator 620 to determine the most likely match between the received command and a command in the corpus of received commands.

Entity probability calculator 620 generally uses a probabilistic model generated from a corpus of known commands to attempt to identify one or more entities in the received command. In some cases, entity probability calculator 620 can first determine whether one or more of the commands in the corpus of known commands comprises a partial match to the received natural language command. As discussed above, a partial match may be represented as a command having a match probability score (e.g., an NER score) exceeding a threshold score. If entity probability calculator 620 identifies a partial match in the corpus of known commands to the received command, probability calculator 620 can attempt to identify the entities in the received command based on the position of entities in the partially matching command from the corpus of known commands. In some cases, entity probability calculator 620 can identify an action word in the received command (e.g., by performing a word search of one or more domain-specific actions to words in the received command) and identify entities on which actions are to be performed based on a word distance from an action word identified in the received command.

Figure 7:
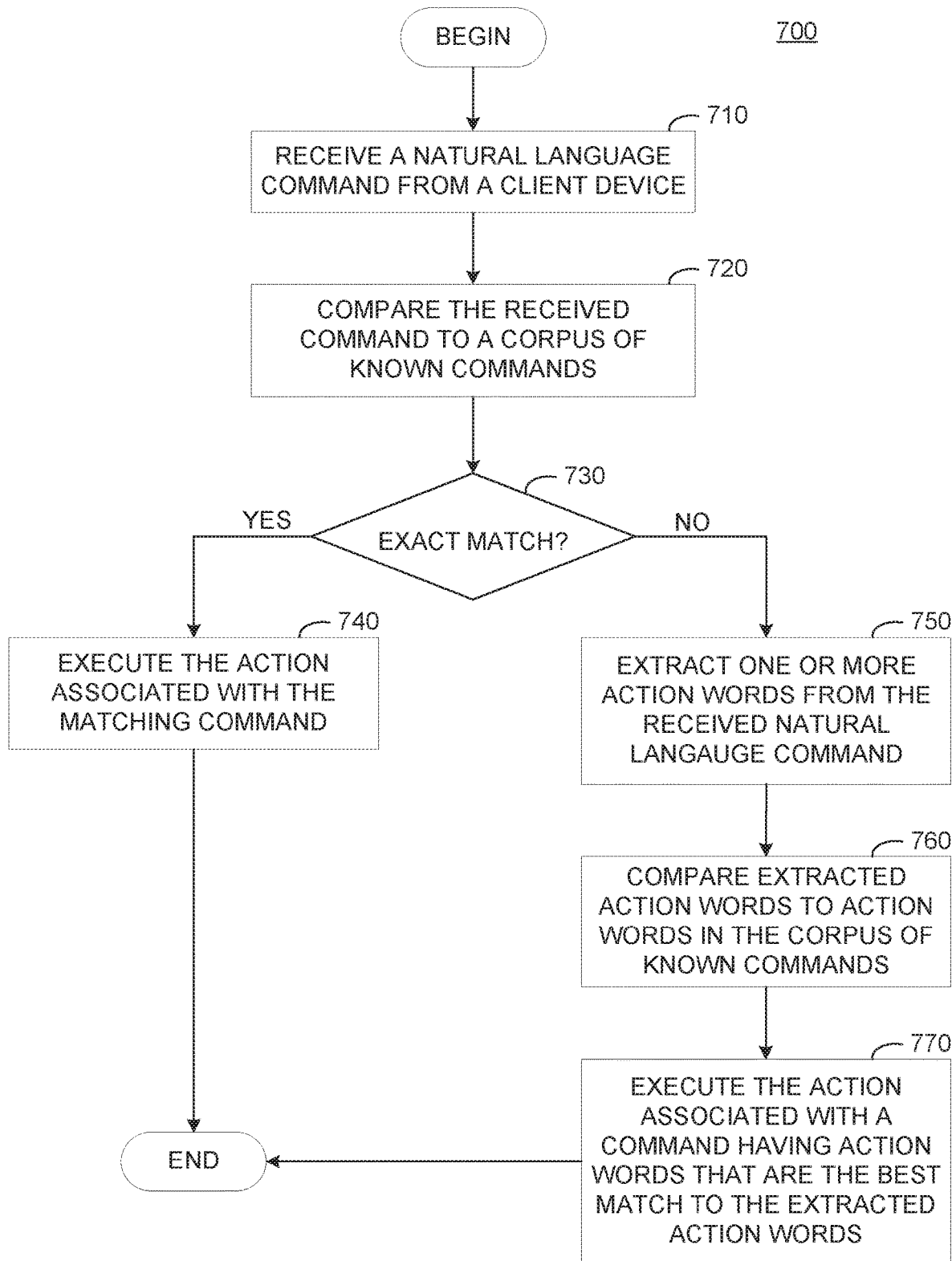
FIG. 7 illustrates exemplary operations that may be performed by a natural language processor to identify and execute a domain-specific action in a domain-specific natural language command, according to one embodiment.

FIG. 7 illustrates exemplary operations 700 for extracting domain-specific actions from a natural language command, according to an embodiment. Operations 700 begin at step 710, where an application server 130 receives a natural language command from a client device 120. Natural language application server 130 may receive the natural language command as a text string or an audio file from client device 120. If application server 130 receives the natural language command from client device 120 as an audio file, natural language application server 130 can convert the audio file to a text string for processing.

At step 720, application server 130 compares the received command to a corpus of known commands. As discussed, the corpus of known commands may include a plurality of commands, with each command mapped to a domain-specific action (e.g., to pay a bill, transfer funds from one account to another account, generate an invoice to send to a specified counterparty, and other domain-specific actions). For each command in the corpus of known commands, application server 130 application server 130 can calculate a match probability score representing the likelihood that the command in the corpus of known commands matches the received command. As discussed above, the match probability score may, in some embodiments, be calculated as a NER score, which calculates the match probability as the percentage of matching words in a command in relation to the total number of words in the command. An NER score of 1 generally represents an exact match between the received command and a command in the corpus of known commands while an NER score of 0 represents a complete mismatch between the received command and a command in the corpus of known commands.

At step 730, application server 130 determines whether any of the commands in the corpus of known commands is an exact match to the received command. If application server 130 determines that an exact match exists between the received command and a command in the corpus of known commands, at step 740, application server 130 executes the action associated with the matching command in the corpus of known commands.

If, however, application server 130 determines that no exact match exists between the received command and the commands in the corpus of known commands, at step 750, application server 130 extracts one or more action words from the received natural language command. In some cases, application server 130 can identify action words in the received natural language command based on a word search of words in the natural language command using a listing of domain-specific actions as a dictionary of words to search for.

At step 760, application server 130 compares the extracted words to action words in the corpus of known commands. To compare the extracted words from the received natural language command to action words in the corpus of known commands, application server 130 can generate one or more match probability scores representing a likelihood that the extracted word matches a known action word from the corpus of known commands. A high match probability score generally indicates a high likelihood that the extracted word matches a known action word, while a low match probability score generally indicates that the extracted word likely is not a match to a known action word.

At step 770, application server 130 executes the action associated with a command having action words that are the best match to the extracted action words. A best match may be defined as the action word having the highest match probability score when compared to an action word extracted from the received natural language command. In some embodiments, as discussed above, when the highest match probability is below a threshold score, application server 130 can request that a user confirm that the action associated with the highest match probability score is the desired action. If the user confirms that the action with the highest match probability score is the desired action, application server 130 can execute the action and add an entry to the training data set associating the extracted action words with the executed action.

Figure 8:
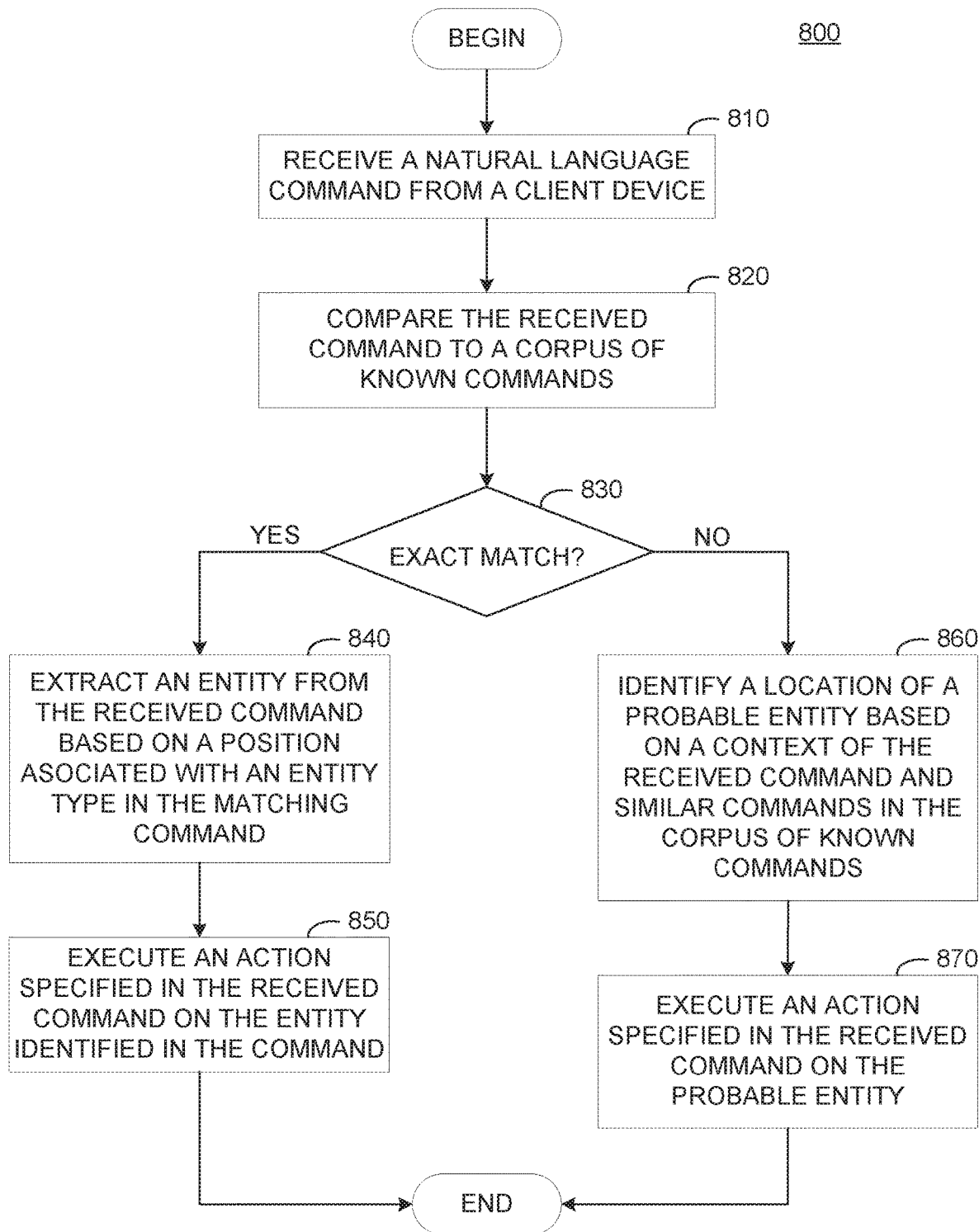
FIG. 8 illustrates exemplary operations that may be performed by a natural language processor to identify an entity in a domain-specific natural language command and perform an action against the identified entity, according to one embodiment.

FIG. 8 illustrates exemplary operations 800 for extracting one or more entities from a received natural language command, according to an embodiment. As illustrated, operations 800 begin at step 810, where an application server 130 receives a natural language command from a client device 120. Natural language application server 130 may receive the natural language command as a text string or an audio file from client device 120. If application server 130 receives the natural language command from client device 120 as an audio file, natural language application server 130 can convert the audio file to a text string for processing.

At step 820, application server 130 compares the received command to a corpus of known commands. As discussed, the corpus of known commands may include a plurality of commands, with each command mapped to one or more domain-specific entities (e.g., payment amounts, counter-parties, and other entities) and position information indicating where each of the one or more entities is located in the command. The position information may be defined as an absolute position in each command and as an offset from an action word in each command. For each command in the corpus of known commands, application server 130 application server 130 can calculate a match probability score representing the likelihood that the command in the corpus of known commands matches the received command. As discussed above, the match probability score may, in some embodiments, be calculated as a NER score, which calculates the match probability as the percentage of matching words in a command in relation to the total number of words in the command. An NER score of 1 generally represents an exact match between the received command and a command in the corpus of known commands while an NER score of 0 represents a complete mismatch between the received command and a command in the corpus of known commands.

At step 830, application server 130 determines whether any of the commands in the corpus of known commands is an exact match to the received command. If application server 130 determines that an exact match exists between the received command and a command in the corpus of known commands, at step 840, application server 130 extracts an entity from the received command based on a position associated with an entity type in the matching command. At step 850, application server 130 executes an action specified in the received command on the entity identified in the command.

If, at step 830, application server 130 determines that no command in the corpus of known commands is an exact match to the received command, at step 860, application server 130 identifies a location of a probable entity based on a context of the received command similar commands in the corpus of known commands. In some cases, application server 130 can determine if a command in the corpus of known commands is a partial match to the received command. If so, application server 130 can use absolute position information from the partially matching command in the corpus of known commands to identify the location of probable entities in the received natural language command. If, however, application server 130 determines that none of the commands in the corpus are a sufficient partial match to the received command, application server 130 can use context information identify one or more probable matching commands, such as a command in the corpus of known commands that is associated with the same action as that specified in the received command. Based on the identified probable matching commands, application server 130 can use a relative distance from an action word to identify one or more entities in the received natural language command. At step 870, application server 870 executes an action specified in the received command on the probable entities identified in the received command.

Figure 9:
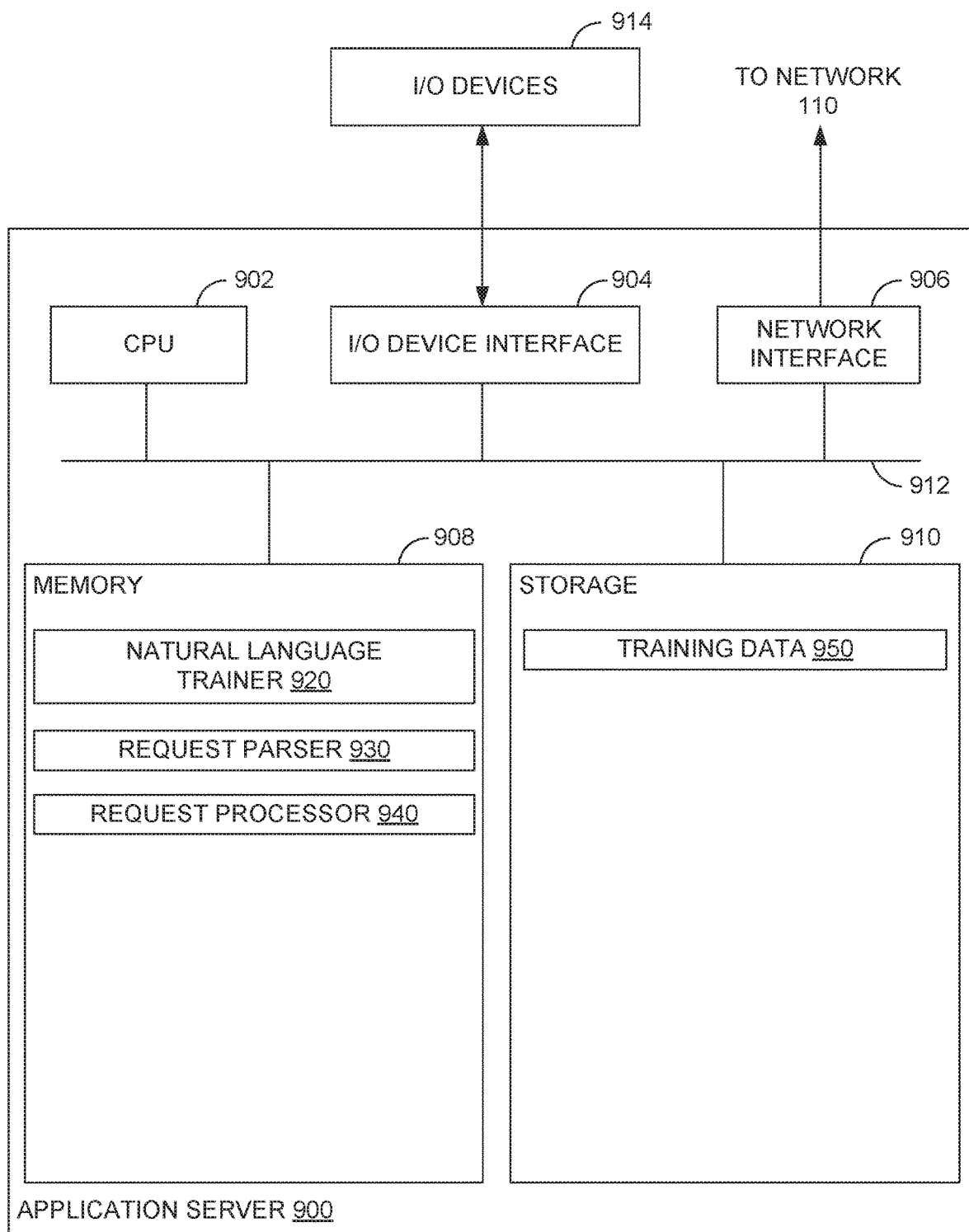
FIG. 9 illustrates exemplary system for extracting actions and entities from domain-specific natural language commands, according to one embodiment.

FIG. 9 illustrates a system 900 that extracts domain-specific actions and entities from a received natural language command, according to an embodiment. As shown, the system 1000 includes, without limitation, a central processing unit (CPU) 902, one or more I/O device interfaces 904 which may allow for the connection of various I/O devices 914 (e.g., keyboards, displays, mouse devices, pen input, etc.) to the system 900, network interface 906, a memory 908, storage 910, and an interconnect 912.

CPU 902 may retrieve and execute programming instructions stored in the memory 908. Similarly, the CPU 902 may retrieve and store application data residing in the memory 908. The interconnect 912 transmits programming instructions and application data, among the CPU 902, I/O device interface 904, network interface 906, memory 908, and storage 910. CPU 902 is included to be representative of a single CPU, multiple CPUs, a single CPU having multiple processing cores, and the like. Additionally, the memory 908 is included to be representative of a random access memory. Furthermore, the storage 910 may be a disk drive, solid state drive, or a collection of storage devices distributed across multiple storage systems. Although shown as a single unit, the storage 1010 may be a combination of fixed and/or removable storage devices, such as fixed disc drives, removable memory cards or optical storage, network attached storage (NAS), or a storage area-network (SAN).

As shown, memory 908 includes a natural language trainer 920, a request parser 930, and a request processor 940. Natural language trainer 920 generally uses one or more training data sets (e.g., stored in training data 950) to generate a set of rules for extracting domain-specific actions and domain-specific entities from a received natural language command. The training data sets may be annotated with information identifying an action associated with each command in the training data set and a position of one or more entities in each command. By analyzing the commands and the annotations associated with each command, natural language trainer 920 can generate one or more rules or a probabilistic model that request parser 930 can use to identify domain-specific actions and domain-specific entities in a received natural language command.

Request parser 930 generally receives a natural language command from a client device 120 and, using the rules and probabilistic model generated by natural language trainer 920, extracts domain-specific actions and domain-specific entities from the natural language command. Request parser 930 receives natural language commands from a client device 120 as a text string or an audio file which request parser converts to a text string for processing. Using the text string, request parser 930 generally compares the received natural language command to commands in a corpus of known commands to attempt to find an exact match to the received command. If request parser 930 finds an exact match to the received command, request parser 930 extracts a domain-specific action from the received command using the domain-specific action mapped to the matching command in the corpus of known commands. Request parser 930 additionally extracts one or more domain-specific entities from the received command based on location information and entity type information associated with the matching command.

If, however, request parser 930 does not find an exact match to the received command, request parser 930 searches for partial matches between the received command and the commands in the corpus of known commands to extract domain-specific actions and entities from the received command. In some cases, request parser 930 can use a match probability score to identify one or more partially matching commands in the corpus of known commands. If request parser 930 finds one or more partially matching commands with a match probability score that exceeds a threshold value, request parser 930 can extract domain-specific actions and entities from the received command based on actions mapped to the partially matching commands and the locations of entities associated with the partially matching command.

In some cases, request parser 930 uses contextual information to extract domain-specific actions and entities from a received natural language command. As discussed, request parser 930 can identify an action word in a received natural language command, which may be a verb, and compare the identified action word to action words in the corpus of known commands to identify an action specified by the natural language command. In another example, request parser 930 can identify an action word in a received natural language command, identify one or more commands in the corpus of known commands associated with the identified action word, and use relative position information to extract one or more entities from the received natural language command.

Request processor 940 generally performs a plurality of domain-specific actions defined by an application programming interface (API). These domain-specific actions, as discussed above, may include payment functions, funds transfer functions, and other functions for which actions and entities may have a specialized meaning within the domain but may not have a specialized meaning in more general command processing domains. Generally, request parser 930 provides to request processor 940 an indication of an action to perform and one or more entities to perform the action on. Request processor 136 uses the indication of the action to perform to execute one or more functions associated with the indicated action and uses the one or more entities provided by request parser 930 as arguments into the one or more functions such that the action is performed on the identified one or more entities. After the one or more functions returns a result, request processor 940 can transmit the returned result to client device 120 for display in application 122.

As shown, storage 910 includes training data 950. Training data 950 may be a repository storing one or more training data sets for training request parser 930. The training data sets may include a plurality of known commands and mappings between the plurality of known commands and domain-specific actions that each command invokes. In other cases, the training data sets may include a plurality of known commands and mappings between the plurality of known commands and entities on which an action can be performed. The mapping data for the entities in a command may, in some embodiments, include information identifying a position in a string at which an entity word is located and a type of the entity (e.g., a counterparty, a payment amount, or other types of entities on which domain-specific actions can be performed).

Advantageously, by training a natural language processing system to recognize domain-specific actions and domain-specific entities, a natural language processing system can expose conversational user interfaces to a user of a client device to perform specialized functions that would otherwise not be understandable to general-purpose natural language processing systems. Because actions and entities in domain-specific applications may have specialized meanings within the domain, a natural language processing system trained using domain-specific information can recognize the significance of the actions and entities in a natural language command and invoke one or more domain-specific functions to perform the specialized actions on the entities identified in received natural language commands.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for processing natural language commands by a processor, comprising:
   receiving, by the processor, a natural language command from a client device;
   identifying a probable matching command in a corpus of known commands by attempting to identify an exact match between the received natural language command and a command in the corpus of known commands, wherein:
      the corpus of known commands comprises a plurality of domain-specific commands representing commands having a specific meaning in a software application, and
      each respective domain-specific command of the plurality of domain-specific commands is:
         annotated with location information of one or more domain-specific entities in the respective domain-specific command, wherein the one or more domain-specific entities represent entities having a specific meaning in the software application, and
         mapped to a function in the software application invoked by the respective domain-specific command;
   generating number, edition error, and recognition error (NER) scores between at least a portion of the received natural language command and each known command in the corpus of known commands;
   upon failing to identify an exact match between the received natural language command and a command in the corpus of known commands based on the generated NER scores:
      identifying the probable matching command in the corpus of known commands based on the generated NER scores, wherein the probable matching command in the corpus of known commands comprises a command having a highest generated NER score;
   identifying, by the processor, one or more entities in the received natural language command to perform an action on based on the location information of the one or more domain-specific entities in the probable matching command; and
   invoking, by the processor on an application server, the function in the software application to which the natural language command is mapped to execute a domain-specific action in the software application on the identified one or more entities.

2. The method of claim 1, wherein identifying an entity in the received natural language command comprises:
   identifying a command in the corpus of known commands that partially matches the received natural language command, and
   extracting an entity from the received natural language command based on a position of an entity in the identified command.

3. The method of claim 2, wherein identifying a command that partially matches the received natural language command comprises:
   generating, for each respective command in the corpus of known commands, a match score representing a probability that the received natural language command matches the respective command, and
   selecting a command having a highest match score as the command that partially matches the received natural language command.

4. The method of claim 3, further comprising:
   upon determining that the match score of the selected command exceeds a threshold match score, performing the domain-specific action against the extracted entity.

5. The method of claim 3, further comprising:
   upon determining that the match score of the selected command is less than a threshold match score:
      prompting a user to indicate whether the extracted entity is correct; and
      upon receiving an indication that the extracted entity is correct, performing the domain-specific action against the extracted entity.

6. The method of claim 1, wherein the respective domain-specific command, includes a mapping between a location of an entity word in the respective domain-specific command and a domain-specific entity type.

7. The method of claim 1, wherein identifying an entity in the received natural language command comprises identifying an exact match between the received natural language command and a command in the corpus of known commands, and wherein the domain-specific action is executed against an entity word mapped to a location of an entity in the probable matching command in the corpus of known commands.

8. The method of claim 1, wherein identifying an entity in the received natural language command comprises:
   identifying one or more partial matches between a word in a position of an entity in one or more commands in the corpus of known commands; and
   selecting one of the one or more partial matches as a probable entity on which to perform a domain-specific action on.

9. The method of claim 1, further comprising:
   receiving a training data set including a plurality of domain-specific commands annotated with information identifying a location of an entity and an entity type in each command; and
   generating one or more rules to identify entities in received natural language commands based on the training data set.

10. A system, comprising:
    a processor; and
    a memory having instructions stored thereon which, when executed by the processor, performs an operation for processing natural language commands by a processor, the operation comprising:
       receiving, by the processor, a natural language command from a client device,
       identifying a probable matching command in a corpus of known commands by attempting to identify an exact match between the received natural language command and a command in the corpus of known commands, wherein:
          the corpus of known commands comprises a plurality of domain-specific commands representing commands having a specific meaning in a software application, and
          each respective domain-specific command of the plurality of domain-specific commands is:
             annotated with location information of one or more domain-specific entities in the respective domain-specific command, wherein the one or more domain-specific entities represent entities having a specific meaning in the software application, and mapped to a function in the software application invoked by the respective domain-specific command, generating number, edition error, and recognition error (NER) scores between at least a portion of the received natural language command and each known command in the corpus of known commands, upon failing to identify an exact match between the received natural language command and a command in the corpus of known commands based on the generated NER scores:

identifying the probable matching command in the corpus of known commands based on the generated NER scores, wherein the probable matching command in the corpus of known commands comprises a command having a highest generated NER score, identifying, by the processor, one or more entities in the received natural language command to perform an action on based on the location information of the one or more domain-specific entities in the probable matching command, and invoking, by the processor on an application server, the function in the software application to which the natural language command is mapped to execute a domain-specific action in the software application on the identified one or more entities.

11. The system of claim 10, wherein identifying an entity in the received natural language command comprises:

identifying a command in the corpus of known commands that partially matches the received natural language command, and extracting an entity from the received natural language command based on a position of an entity in the identified command.

12. The system of claim 11, wherein identifying a command that partially matches the received natural language command comprises:

generating, for each respective command in the corpus of known commands, a match score representing a probability that the received natural language command matches the respective command, and selecting a command having a highest match score as the command that partially matches the received natural language command.

13. The system of claim 12, wherein the operation further comprises:

upon determining that the match score of the selected command exceeds a threshold match score, performing the domain-specific action against the extracted entity.

14. The system of claim 12, wherein the operation further comprises:

upon determining that the match score of the selected command is less than a threshold match score:

prompting a user to indicate whether the extracted entity is correct; and upon receiving an indication that the extracted entity is correct, performing the domain-specific action against the extracted entity.

15. The system of claim 10, wherein the respective domain-specific command includes a mapping between a location of an entity word in the respective domain-specific command and a domain-specific entity type.

16. The system of claim 10, wherein identifying an entity in the received natural language command comprises identifying an exact match between the received natural language command and a command in the corpus of known commands, and wherein the domain-specific action is executed against an entity word mapped to a location of an entity in the probable matching command in the corpus of known commands.

17. The system of claim 10, wherein identifying an entity in the received natural language command comprises:

identifying one or more partial matches between a word in a position of an entity in one or more commands in the corpus of known commands; and selecting one of the one or more partial matches as a probable entity on which to perform a domain-specific action on.

18. The system of claim 10, wherein the operation further comprises:

receiving a training data set including a plurality of domain-specific commands annotated with information identifying a location of an entity and an entity type in each command; and generating one or more rules to identify entities in received natural language commands based on the training data set.

19. A non-transitory computer-readable medium comprising instructions which, when executed by one or more processors, performs an operation for processing natural language commands by the one or more processors, the operation comprising:

receiving, by the processor, a natural language command from a client device;

identifying a probable matching command in a corpus of known commands by attempting to identify an exact match between the received natural language command and a command in the corpus of known commands, wherein:

the corpus of known commands comprises a plurality of domain-specific commands representing commands having a specific meaning in a software application, and each respective domain-specific command of the plurality of domain-specific commands is:

annotated with location information of one or more domain-specific entities in the respective domain-specific command, wherein the one or more domain-specific entities represent entities having a specific meaning in the software application, and mapped to a function in the software application invoked by the domain-specific command;

generating number, edition error, and recognition error (NER) scores between at least a portion of the received natural language command and each known command in the corpus of known commands;

upon failing to identify an exact match between the received natural language command and a command in the corpus of known commands based on the generated NER scores:

identifying the probable matching command in the corpus of known commands based on the generated NER scores, wherein the probable matching command in the corpus of known commands comprises a command having a highest generated NER score;

identifying, by the processor, one or more entities in the received natural language command to perform an action on based on the location information of the one or more domain-specific entities in the probable matching command; and invoking, by the processor on an application server, the function in the software application to which the natural language command is mapped to execute a domain-specific action in the software application on the identified one or more entities.

20. The computer-readable medium of claim 19, wherein the operation further comprises:

receiving a training data set including a plurality of domain-specific commands annotated with information identifying a location of an entity and an entity type in each command; and generating one or more rules to identify entities in received natural language commands based on the training data set.

* * * * *